United States Patent [19]

Tsuboka

[11] Patent Number: 5,307,444
[45] Date of Patent: Apr. 26, 1994

[54] VOICE ANALYZING SYSTEM USING HIDDEN MARKOV MODEL AND HAVING PLURAL NEURAL NETWORK PREDICTORS

[75] Inventor: Eiichi Tsuboka, Osaka, Japan

[73] Assignee: Matsushita Electric Industrial Co., Ltd., Tokyo, Japan

[21] Appl. No.: 626,300

[22] Filed: Dec. 12, 1990

[30] Foreign Application Priority Data

Dec. 12, 1989 [JP]  Japan .................................. 1-322148

[51] Int. Cl.[5] .............................. G10L 5/00; G10L 7/08
[52] U.S. Cl. .................................. 395/22; 395/2.65; 395/23; 381/43
[58] Field of Search ..................... 364/513, 513.5, 807; 395/22, 2, 23; 381/43

[56] References Cited

U.S. PATENT DOCUMENTS

| | | | |
|---|---|---|---|
| 4,783,804 | 11/1988 | Juang et al. | 381/43 |
| 4,885,757 | 12/1989 | Provence | 375/96 |
| 5,027,406 | 6/1991 | Roberts et al. | 381/43 |

OTHER PUBLICATIONS

Bengio et al., "Use of Neural Networks for the Recognition of Place of Articulation", *1988 IEEE Conference on Acoustics & Speech Processing*, pp. 103–106.
Lang et al., "A Time-Delay Neural Network Architecture for Isolated Word Recognition", *Neural Networks*, v. 3, N. 1, 1990, pp. 23–43.

*Primary Examiner*—Allen R. MacDonald
*Assistant Examiner*—George Davis
*Attorney, Agent, or Firm*—Wenderoth, Lind & Ponack

[57] ABSTRACT

An analyzing system analyzes object signals, particularly voice signals, by estimating a generation likelihood of an observation vector sequence being a time series of feature vectors with use of a Markov model having a plurality of states and given transition probabilities from state to state. A state designation section determines a state i at a time t stochastically using the Markov model. Plural predictors, each of which is composed of a neural network and is provided per each state of the Markov model, are provided for generating a predictional vector of the feature vector $x_t$ in the state i at the time t based on values of the feature vectors other than the feature vector $x_t$. A first calculation section calculates an error vector of the predictional vector to the feature vector $x_T$. A second calculation section calculates a generation likelihood of the error vector using a predetermined probability distribution of the error vector according to which the error vector is generated.

5 Claims, 7 Drawing Sheets

VOICE ANALYZING SYSTEM USING HIDDEN MARKOV MODEL AND HAVING PLURAL NEURAL NETWORK PREDICTORS

BACKGROUND OF THE INVENTION

1. Field of the Invention

The present invention relates to a generating system using hidden Markov models for analyzing time series signals such as voice signals, and more particularly, to a system providing non-linear predictors comprised of neural networks.

2. Description of the Related Art

Conventionally, various systems for analyzing time series signals such as voice signals have been developed.

As an example of such an analyzing system for time series signals, in FIG. 8, there is shown an apparatus for speech recognition using a hidden Markov model (hereinafter, referred to as HMM).

In the system shown in FIG. 8, a speech analyzing section 101 transforms input voice signals into a series of feature vectors using a known method such as a filter bank, Fourier transformation, or LPC (Linear Predictive Calculation) analysis. Each feature vector is formed for every predetermined time period (hereinafter referred to as a "frame"), for instance, 10 msec. Accordingly, the input voice signals are transformed into a series x of feature vectors $x_1$ to $x_T$ wherein T is a number of frames. A section 102 is denoted a "code book" and has stored therein representative vector labels.

A vector quantizing section 103 replaces respective feature vectors of the vector series x with the representative vector labels estimated to be nearest thereto, respectively, with reference to the code book 102.

The series of labels thus obtained is sent to a probability calculation section 106. This section 106 calculates a generation probability of the label series of an unknown input speech using HMMs stored in an HMM memory section 105.

These HMMs are formed in advance by an HMM forming section 104. In order to form HMMs, an architecture of the HMM such as a number of states, and transition rates allowed between individual pair of states, are first determined. Thereafter, a plurality of label series obtained by pronouncing a word many times are learned and generation probabilities of respective labels generated according to the architecture of the HMM are estimated so that generation probabilities of respective label series become as high as possible.

The generation probabilities calculated by the section 106 are compared with each other in a comparison and judging section 107 which distinguishes a word corresponding to the HMM and which provides a maximum generation probability among the HMMs corresponding to respective words.

The speech recognition using HMMs is effected in the following manner.

Assuming the label series obtained from an unknown input as $O = o_1, o_2, \ldots, o_T$ and an arbitrary state series of a length T generated corresponding to a word v by the model $\lambda^v$ as $s = s_1, s_2, \ldots, s_T$, a probability at which the label series O is generated from the model $\lambda^v$ is given by;

[exact solution]

$$L_1(v) = \sum_s P(O,S|\lambda^v) \tag{1}$$

[approximate solution]

$$L_2(V) = \max_s [P(O,S|\lambda^v)] \tag{2}$$

or in a logarithmic form, $$L_3(v) = \max_s [\log\{P(O,S|\lambda^v)\}] \tag{3}$$

wherein $P(x,y|\lambda^v)$ is a simultaneous probability density of x and y in the model $\lambda^v$.

Accordingly, the result of recognition is obtained using one of the equations (1) to (3), for instance the equation (1), as follows;

$$\hat{v} = \underset{v}{argmax}[L_1(v)] \tag{4}$$

$P(O,S|\lambda)$ is calculated in the case of the equation (1) as described below.

Assuming that a generation probability $b_i(O)$ of a label o and a transition probability $a_{ij}$ from one state $q_i$ to another state $q_j$ (i,j are integers from 1 to I) are given to every state $q_i$ of the model $\lambda$, the generation probability of the label series $O = o_1, o_2, \ldots, o_T$ to the state series $S = s_1, s_2, \ldots, s_T$ in the model $\lambda$ is defined as follows;

$$P(O,S|\lambda) = \prod_{t=1}^{T+1} a_{s_{t-1}s_t} \prod_{t=1}^{T} b_{s_t}(o_t) \tag{5}$$

wherein $a_{s_0 s_1}$ is an initial probability of the state $s_1$ and $s_{T+1} = q_f$ is a final state in which no labels are generated.

Although individual input feature vectors x are transformed into labels in the above example, there is also proposed a method in which a probability density function of each feature vector x in each state is given without using labels. In this case, the probability density $b_i(x)$ of the feature vector x is used instead of $b_i(o)$ and the above equations (1), (2) and (3) are rewritten as follows;

[exact solution]

$$L_1'(v) = \sum_s P(X,S|\lambda^v) \tag{1'}$$

[approximate solution]

$$L_2'(v) = \max_s [P(X,S|\lambda^v)] \tag{2'}$$

or, in a logarithmic form, $$L_3'(v) = \max_s [\log\{P(X,S|\lambda^v)\}] \tag{3'}$$

The final recognition result v of the input voice signals x is given by the following equation in both methods provided that the model $\lambda^v$ (v=1 to V) has been prepared.

$$v = \text{argmax}[P(X|\lambda^v)]$$
$$\quad\quad v$$

(6)

in which X is a series of labels or a series of feature vectors in accordance with the method employed.

A typical conventional HMM used for speech recognition is shown in FIG. 9 in which $q_i$, $a_{ij}$ and $b_i(x)$ indicates an i-th state, a transition probability from the i-th state to j-th state and a probability density of the label of the feature vector x.

In this model, the state $q_i$ is considered to correspond to a segment i of the speech corresponding to the HMM. Accordingly, the probability density $b_i(x)$ in the case that x is observed in the state $q_i$ is considered to be the probability density in the case that x is generated in the segment i and the probability density $a_{ij}$ is considered to be the probability in the case that $x_{t+1}$ at time t+1 is again included in the segment i when $x_t$ at time t is included therein. According to the above, the following two points may be identified as drawbacks in the conventional HMM.

(1) Dynamic features, i.e. features in the time variation of feature vectors are not suitably represented, since parameters defining the function $b_i(x)$ are assumed to be time-invariant, for instance, in the case where the distribution of x is assumed to be a normal distribution, and accordingly they are given by a matrix covariant with average vectors.

(2) Since transition probabilities $a_{ii}$ and $a_{ij}$ are assumed to be constant regardless of the length of the tribus of the state $q_i$ in the conventional HMM, although the length t of the segment i is considered to be subject to a probability distribution, the length of the segment i is subject to an exponential distribution as the result thereof and, accordingly, this distribution can not properly represent an actual state.

In FIG. 10, a result of analysis with respect to a voice signal as shown in (a) thereof is shown in (c) thereof which is obtained by using an HMM as shown in (b) thereof.

As is apparent from comparison of (c) with (a), the resultant vectors exhibit unnatural jumps between adjacent states.

In order to solve the second problem, there have been proposed methods in which Poisson distribution and/or $\Gamma$ distribution are used as a probability density function $d_i(\tau)$ related to the length t of the tribus of the state $q_i$.

However, these methods fail to completely solve the problems of the conventional HMM method.

In the meanwhile, it has been reported that the neural network model is very effective for pattern recognition and feed forward type neural network exhibits an excellent property to static patterns. However, it has not been impossible to apply the neural network to non-static signals, such as voice signals, accompanying non-linear expansion and contraction of the time axis.

SUMMARY OF THE INVENTION

One of the objects of the present invention is to provide a neural predictive HMM capable of enjoying the advantages of both the HMM and the neural network model.

Another object of the present invention is to provide an improved HMM recognition system using predictors composed of neural networks.

A further object of the present invention is to provide a predictor which is capable of predicting a series of feature vectors or labels using a neural network model.

In order to achieve these object, according to the present invention, it is assumed that the time variation of the feature vector in the state $q_i$ exhibits a uniform time tendency in the same segment (state).

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
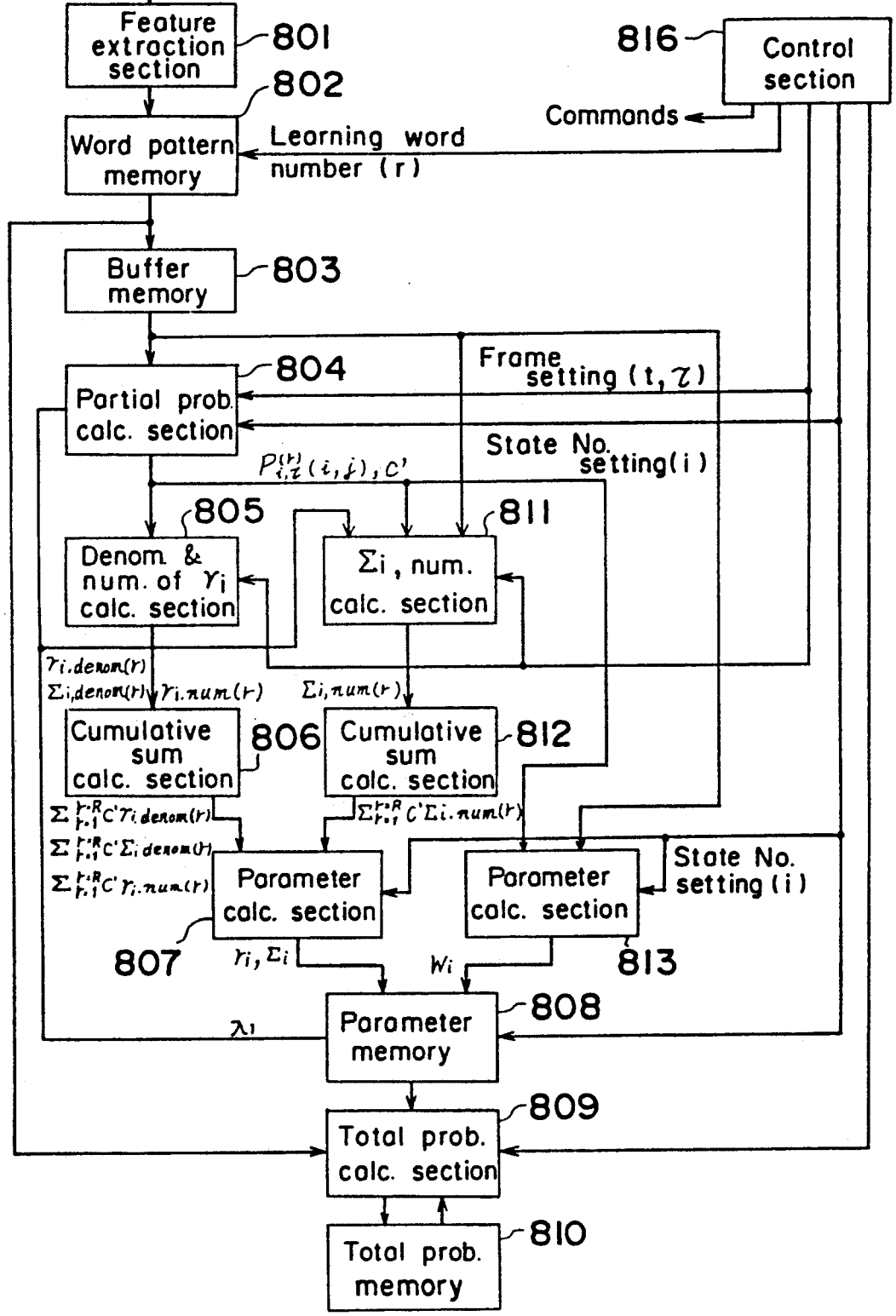
FIG. 1 is block diagram of the composition of the speech recognition system according to the present invention.

The symbols used hereinafter are first defined.

For the sake of brevity, states $q_i$, $q_j$ and the like are simply denoted by suffixes i, j and the like.

Learning of the model is explained with respect to a word v mainly and, accordingly, this symbol is usually omitted. However, if it becomes necessary to discriminate the target word v from another word, the suffix v is added to the right of each parameter.

i=1, 2, ..., I: i-th state, $[a_{ij}]$: transition matrix, $a_{ij}$: transition probability from the state i to the state j, $X_t^{(r)}$: observation vector in t-th frame of training pattern r ( r=1, 2, ..., R), $b_i(\,)X_t^{(r)}$: probability density of $X_t^{(r)}$ in the state i, $w_i^{u-1}{}_{fg}$: weighting coefficient for connection from f-th unit of (u-1)-th layer to g-th unit of u-th layer of the neutral network of the state i, $w_i$: set of weighting coefficients of the neural network of the state i, $X^{(r)} = x_1^{(r)}, x_2^{(r)}, \ldots, X_{T(r)}^{(r)}$; r-th pattern of the word v, $X_t^{(r)}$: output vector (prediction vector of $x_t$) obtained from the neural net when a partial series of $X^{(6)}$ is inputted thereinto, $e_t^{(r)}$: prediction error vector, ($e_t^{(r)} = x_t^{(r)} - x_t^{(r)}$), $S^{(r)} = s_1^{(r)}, s_2^{(r)}, \ldots, s_{T(r)}^{(r)}$: series of states corresponding to $X^{(r)}$, $s_t^{(r)}$: state in t-th frame of r-th training pattern corresponding to the word v, $T^{(r)}$: number of frames of r-th training pattern corresponding to the word v, $\xi_i$: set of parameters defining weighting coefficients of the neural network in the state i, probability distribution of prediction error vector and that of the length of continuation of the state i, $$\lambda_i = \{\xi_i, (a_{ij})_{j=1}^{j=I}\}:$$

set of parameters of the state i, $\lambda = \{\lambda_i\}$: set of all parameters (there may be a case in that a model defined by the parameter set $\lambda$ is called "model $\lambda$"), $P(X|\lambda)$: probability at which observation vector series x is generated from the model $\lambda$, $q_f$: final state , ($= s_{T+1}^{(r)}$)

$\pi_i = a_{s_0 i}$: probability at which the state i is generated in the first frame (t=1).

Learning method of HMM corresponding to word V

In this learning method, the parameter set $\lambda$ is estimated to maximize a probability function $P(X)^{(1)}, X^{(2)'}, \ldots, X^{(R)}|\lambda)$ defined to training patterns (r=1 to R) prepared about the word v.

Assuming $X^{(r)}$ is independent from each other, the following equation is obtained.

$$P(X^{(1)}, \ldots, X^{(R)}|\lambda) = \prod_{r=1}^{R} P(X^{(r)}|\lambda) \tag{7}$$

$$= \prod_{r=1}^{R} \left( \sum_{s^{(r)}} P(X^{(r)}, S^{(r)}|\lambda) \right)$$

$$= \sum_{s^{(1)}} \ldots \sum_{s^{(R)}} \prod_{k=1}^{R} P(X^{(k)}, S^{(k)}|\lambda)$$

Herein, an auxiliary function $Q(\lambda,\lambda')$ is defined as follows;

$$Q(\lambda,\lambda') = \sum_{s^{(1)}} \ldots \sum_{s^{(R)}} \left[ \prod_{k=1}^{R} P(X^{(k)}, S^{(k)}|\lambda) \right] \times \tag{8}$$

$$\log \left[ \prod_{k=1}^{R} P(X^{(k)}, S^{(k)}|\lambda) \right]$$

Referring to equations (7) and (8), the following relation is obtained.

If $Q(\lambda,\lambda') \geq Q(\lambda,\lambda)$, then $P(X^{(1)}, \ldots, X^{(R)}|\lambda') \geq P(X^{(1)}, \ldots, X^{(R)}|\lambda)$, and when $\lambda' = \lambda$, both become equal.

Accordingly, if it is possible to obtain the following equation;

$$\lambda = \underset{\lambda'}{argmax}[Q(\lambda, \lambda')] \tag{9}$$

$\lambda$ converges at a stationary point of $P(X^{(1)}, \ldots, X^{(R)}|\lambda)$ i.e. a point which gives a maximum value or a saddle point thereof by applying the equation (9) repeatedly while substituting the $\lambda$ obtained for $\lambda$ and, accordingly, a local optimal solution is obtained by repeating the above calculation until the rate of change of $P(X^{(1)}, \ldots, X^{(R)}|\lambda)$ becomes smaller than a predetermined threshold value.

Next, a method for estimating parameters using $Q(\lambda,\lambda')$ is explained.

The following equation is obtained by transforming the equation (9).

$$Q(\lambda, \lambda') = P(X^{(1)}, \ldots, X^{(R)}|\lambda) \sum_{r=1}^{R} \frac{1}{P(X^{(r)}|\lambda)} \times \tag{10}$$

$$\sum_{s^{(r)}} P(X^{(r)}, S^{(r)}|\lambda) \log P(X^{(r)}, S^{(r)}|\lambda')$$

According to the explanation mentioned above, if $\lambda'$ which gives $Q(\lambda,\lambda') > Q(\lambda,\lambda)$ is found out assuming that $Q(\lambda,\lambda')$ is a function of $\lambda'$, it becomes a renewed one of $\lambda$. However, this is equivalent to finding $\lambda'$ which gives an inequality $Q^*(\lambda,\lambda') > Q^*(\lambda,\lambda)$ assuming the following equation.

$$Q^*(\lambda, \lambda') = Q(\lambda, \lambda')/P(X^{(1)}, \ldots, X^{(R)}|\lambda) = \tag{11}$$

$$\sum_{r=1}^{R} c^{(r)} \sum_{s^r} P(X^{(r)}, S^{(r)}|\lambda) \log P(X^{(r)}, S^{(r)}|\lambda')$$

wherein $c^{(r)} = 1/P(X^{(r)}|\lambda)$.

The equation (11) is further transformed as follows;

$$Q^*(\lambda, \lambda') = \sum_{r=1}^{R} c^{(r)} \sum_{s^{(r)}} P(X^{(r)}, S^{(r)}|\lambda) \times \tag{12}$$

$$\left( \sum_{t=1}^{T^{(r)}+1} \log a_{s_{t-1}^{(r)} s_t^{(r)}}' + \sum_{t=1}^{T^{(r)}} b_{s_t^{(r)}}(x_t^{(r)})' \right)$$

Figure 2:
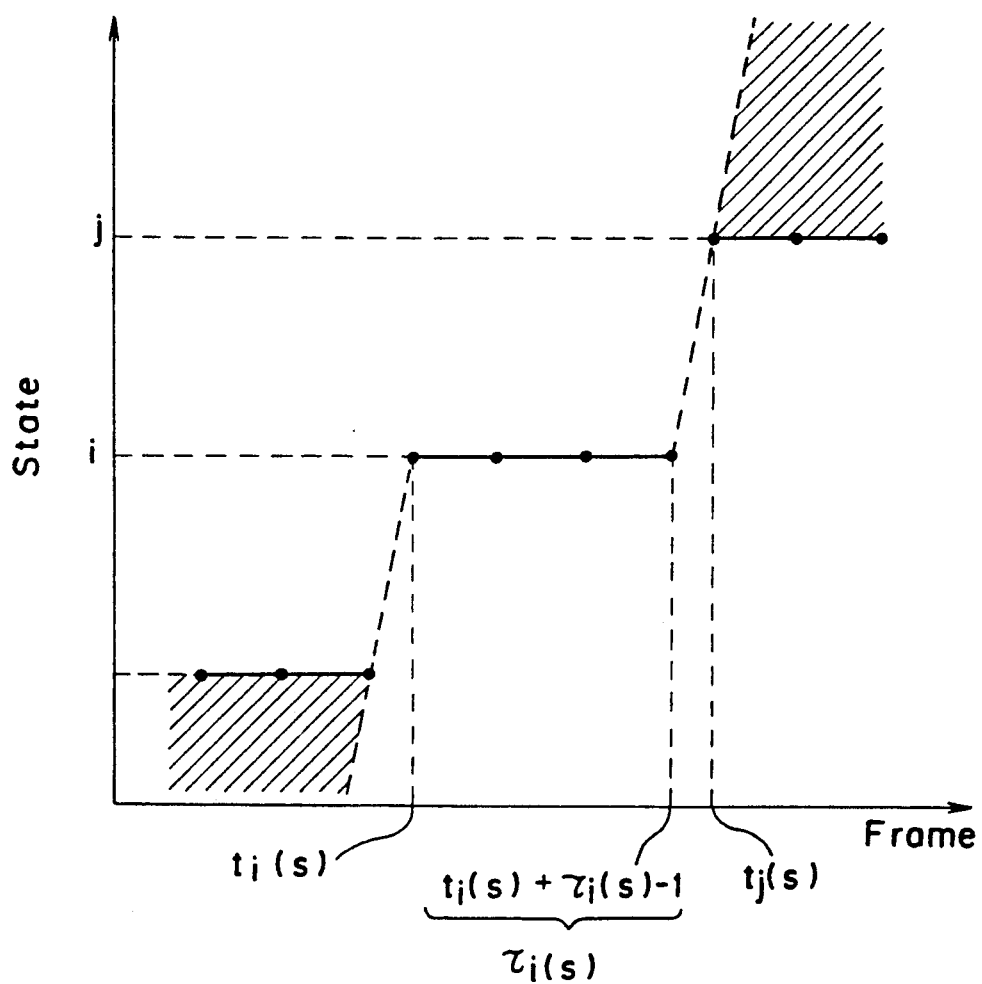
FIG. 2 is an explanatory view for explaining a method for estimating parameters of the HMM according to the present invention.

If the HMM now considered is of a left to right type and, accordingly, the state never returns to a state having been left therefrom, the following two equations (13) and (14) are derived from the equation (12) assuming that $t_i(s^{(r)})$ denotes a starting time of the state i in the state series $\tau_i(S^{(r)})$ and $\tau_i(s^{(r)}) = t_j(s^{(r)}) - t_i(s^{(r)})$ denotes a hold time of the state i (the state j is assumed to be a next state following the state i, as shown in FIG. 2).

$$\frac{\partial Q^*(\lambda, \lambda')}{\partial^* a_{ij}'} = \sum_{r=1}^{R} c^{(r)} \sum_{s^{(r)}} P(X^{(r)}, S^{(r)}|\lambda) \frac{\partial}{\partial a_{ij}'} \times \tag{13}$$

$$\left[ \sum_{t=1}^{t_j(s^{(r)})-1} \log a_{s_{t-1}^{(r)} s_t^{(r)}}' + \log d_i(\tau_i(S^{(r)}))' + \right.$$

$$\log \log a_{s_j(s^{(r)})(s^{(r)})-1 s_j(s^{(r)})}' + \sum_{t=t_j(s^{(r)})}^{T^{(r)}+1} \log a_{s_{t-1}^{(r)} s_t^{(r)}}' +$$

-continued $$\sum_{k=1}^{\tau(s^{(r)})} b_s(r) (x_t^{(r)})' \Bigg] = \sum_{r=1}^{R} c^{(r)} \sum_{t=2}^{T^{(r)}+1} \sum_{\tau=1}^{t-1} p_t^{(r)}(i,j,\tau) \frac{1}{a_{ij}}$$

$$\frac{\partial Q^*(\lambda,\lambda')}{\partial \xi_i} = \sum_{r=1}^{R} c^{(r)} \sum_{t=2}^{T^{(r)}+1} \sum_{\tau=1}^{t-1} \sum_{j=1(\neq i)}^{I} p_t^{(r)}(i,j,\tau) \times \quad (14)$$

$$\frac{\partial}{\partial \xi_i} \Bigg[ \log d_i(\tau)' + \sum_{k=1}^{\tau(s^{(r)})} b_s(r) (x_t^{(r)})' \Bigg]$$

In the equation (14), $P_t^{(r)}(i,j,\tau)$ is defined as follows, provided that $i_1$ indicates an initial state in the tribus of the state i.

$$P_t^{(r)}(i,j,\tau) = P(X^{(r)}, s_{t-\tau}^{(r)} = i_1, s_t^{(r)} = j_1 | \lambda)$$

$$P(X, s_{t-\tau}^{(r)} = i_1, s_t^{(r)} = j_1 | \lambda)$$

is a simultaneous probability density of $X^{(r)}$, $$s_{t-\tau}^{(r)} = i_1$$

and $s_t^{(r)} = j_1$ in the model $\lambda$ and, in other words, denotes a total sum of generation probability densities of paths passing through the hatched areas shown in FIG. 2. Using this relation, it becomes possible to calculate the total sum related to the path $S^{(r)}$ in the equations (13) and/or (14) at two divided stages.

Namely, the total sum is first calculated with respect to paths passing through the hatched areas in the entire range of t, $\tau$ and j and, then, the total sum is calculated over the entire range of t, $\tau$ and j obtained as results.

Transformation from the first equation to the second one in the equation (13) or (14) is based on this consideration.

Said $$p_{t,\tau}^{(r)}(i,j)$$

can be obtained as follows.

Namely, defining the following equations $$\alpha_t^{(r)}(i) = P(x_1^{(r)}, x_2^{(r)}, \ldots, x_{t-1}^{(r)}, s_t^{(r)} = i_1 | \lambda) \quad (15)$$

$$\beta_t^{(r)}(i) = P(x_t^{(r)}, x_{t+1}^{(r)}, \ldots, x_T^{(r)} | s_t^{(r)} = i_1, \lambda)$$

it is represented as follows:

$$p_{t,\tau}^{(r)}(i,j) = P(X, s_{t-\tau}^{(r)} = i_1, s_t^{(r)} = j_1 | \lambda) = \quad (16)$$

$$\alpha_{t-\tau}^{(r)}(i) d_i(\tau) a_{ij} \prod_{k=1}^{\tau} b_i(x_{t-\tau-1+k}^{(r)}) \beta_t^{(r)}(j)$$

Then, the following recurrence formulae are introduced.

$$\alpha_t^{(r)}(j) = \sum_i \sum_\tau \alpha_{t-\tau}^{(r)}(i) d_i(\tau) a_{ij} \times \prod_{k=1}^{\tau} b_i(x_{t-\tau-1+k}^{(r)}) \quad (17)$$

$$\beta_t^{(r)}(i) = \sum_j \sum_\tau d_i(\tau) a_{ij} \prod_{k=1}^{\tau} b_i(x_{t-\tau-1+k}^{(r)}) \times \beta_{t+\tau}^{(r)}(j) \quad (18)$$

Accordingly, the equation (16) can be calculated by calculating $\alpha_t^{(r)}(j)$ from $t=1$ to $T^{(r)}+1$ and $j=1$ to I in turn according to the equation (17) after setting $\alpha_1^{(r)}(1)=1$ and giving suitable initial values to the parameter set $\lambda$ and by calculating $\beta_t^{(r)}(i)$ from $t=T^{(r)}+1$ to 1 and from $i=I$ to 1 in turn according to the equation (18) after setting $$\beta_{T^{(r)}+1}^{(r)}(j) = 1.$$

Estimation of transition probability $a_{ij}$
A Lagrange multiplier method is used therefor.
Using the equation (13) and the following equation;

$$\sum_{j=1(\neq i)}^{I} a_{ij}' = 1$$

the following equation is obtained $$0 = \frac{\partial}{\partial a_{ij}} \Bigg[ Q^*(\lambda,\lambda') - \theta \sum_{k=1(\neq i)}^{I} a_{ik}' \Bigg]$$

$$= \sum_{r=1}^{R} c^{(r)} \sum_{t=2}^{T^{(r)}+1} \sum_{\tau=1}^{t-1} p_{t,\tau}^{(r)}(i,j) \frac{1}{a_{ij}} - \theta$$

From this equation, $\theta$ is obtained by multiplying $a_{ij}'$ on both sides of the equation and, thereafter, taking a sum from $j=I$ to 1 as follows;

$$\theta = \sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j)$$

Accordingly, the reestimation value of $a_{ij}$ is given by the following equation.

$$a_{ij} = \frac{\sum_{r=1}^{R} c^{(r)} \sum_{t=2}^{T^{(r)}+1} \sum_{\tau=1}^{t-1} p_{t,\tau}^{(r)}(i,j)}{\sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j)} \quad (19)$$

Estimation of probability density of length of the tribus of the state

In this process, parameters defining the probability density of the length of the tribus of the state i are estimated.

For example, if $a_{ij} = \gamma_i$ (constant), then $$d_i(\tau) = \gamma_i^{\tau-1}(1-\gamma_i).$$

From the equation (14) and by setting $\xi_1' = \gamma_i'$, the following equation is obtained $$0 = \sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j) \times$$

$$\frac{\partial}{\partial \gamma_i} \log d_i(\tau)'$$

$$= \sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j) \times$$

-continued $$\left[ \frac{\tau - 1}{\gamma_i'} + \frac{1}{1 - \gamma_i'} \right]$$

and accordingly, the reestimation value of $\gamma_i$ is given by the following equation.

$$\gamma_i' = \frac{\sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j)(\tau - 1)}{\sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j)\tau} \quad (20)$$

If $d_i(t)$ obeys another distribution, for instance, a Poisson distribution as follows;

$$d_i(\tau) = \frac{\gamma_i^\tau}{\tau!} \exp[-\gamma_i]$$

the following equation is obtained in a manner similar to the above.

$$0 = \sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j) \times$$

$$\frac{\partial}{\partial \gamma_i'} \log d_i(\tau)'$$

$$= \sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j) \times \left[ \frac{\tau}{\gamma_i'} - 1 \right]$$

Further, $\gamma_i$ is thereby given by the following equation.

$$\gamma_i = \frac{\sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j)\tau}{\sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j)} \quad (21)$$

Estimation of parameters related to $b_i(x)$

In the conventional HMM, $b_i(x)$ is usually defined as a probability density of the feature vector x in the state i. Namely, if this probability density is assumed to obey a normal distribution, it is represented by $$b_i(x_t) = N(x_t; \mu_i, \Sigma_i)$$

wherein $\mu_i$ is an average vector and $s_i$ is a variance-covariance matrix. Since $\mu_i$ is invariant when the state i continues, a value of a product of probability densities such as $b_i(x_{t-1}) b_i(x_t) b_i(x_{t+1})$ is irrelevant to the order of generation of $x_t$. Accordingly, representation of dynamic features of a time series is insufficient in the conventional model.

In contrast, $\mu_i$ is treated as time variant by accepting influence due to the past series of feature vectors in the present invention. Namely, a predictive value to a feature vector $x_t$ at a time t of input voice signals in predicted by a non-linear predictor comprised of a neural network defined in every state and $\mu_i$ is replaced by the predicative value as follows;

$$b_i(x_t) = N(x_t; g_i(t), \Sigma_i) = N(x_t - g_i(t); 0, \Sigma_i)$$

Thus, $b_i(x_t)$ is a probability density of the predicative error.

For instance, assuming that $x_t$ is predicted from a time series $x_{t-c_1}, x_{t-c_2}, \ldots, x_{t-c_M}$ ($c_1 < c_2 < \ldots < c_M$) and the predicative error is given by a normal distribution, $b_i(x_t)$ is given as follows.

$$b_i(x_t) = \left[ \frac{1}{2\pi} \right]^{d/2} |\Sigma_i^{-1}|^{1/2} \times$$

$$\exp\left[ -\frac{1}{2} \{x_t - g_i(t)\}^T \Sigma_i^{-1} \{x_t - g_i(t)\} \right],$$

By taking the logarithm of the above equation, the following is obtained.

$$\log b_i(x_t) = \frac{d}{2} \log\left[ \frac{1}{2\pi} \right] + \quad (22)$$

$$\frac{1}{2} \log|\Sigma_i^{-1}| - \frac{1}{2} \{x_t - g_i(t)\}^T \Sigma_i^{-1} \{x_t - g_i(t)\}$$

Assuming that $W_i$ is a set of weighting coefficients of the neural network in the state i, $h_i(i) = h(x_{t-c_1}, x_{t-c_2}, \ldots, x_{t-c_M}; W_i)$ is an output of the neural network to inputs $x_{t-c_1}, x_{t-c_2}, \ldots, x_{t-c_M}$ which is a function characterized by $W_i$, and $\mu_i$ is a vector which is held constant in the state i, $g_i(i)$ can be represented by an equation $g_i(i) = \mu_i + h_i(i)$. A reestimation equation of $\mu_i$ can be introduced in a manner similar to the introduction of the average vector in the parameter estimation of the conventional HMM. However, it is also possible to include $\mu_i$ in $W_i$ considering it as a bias input to the final layer of the neural network.

In this preferred embodiment, the latter case is explained. Further, $\Sigma_i = [mn]\sigma_{imn} = [\sigma_i^{mn}]^{-1}$ is a variance-covariance matrix of $x_t - g_i(i)$. Accordingly, parameters to be estimated are the variance-covariance matrix and weighting coefficients $W_i$.

Figure 3:
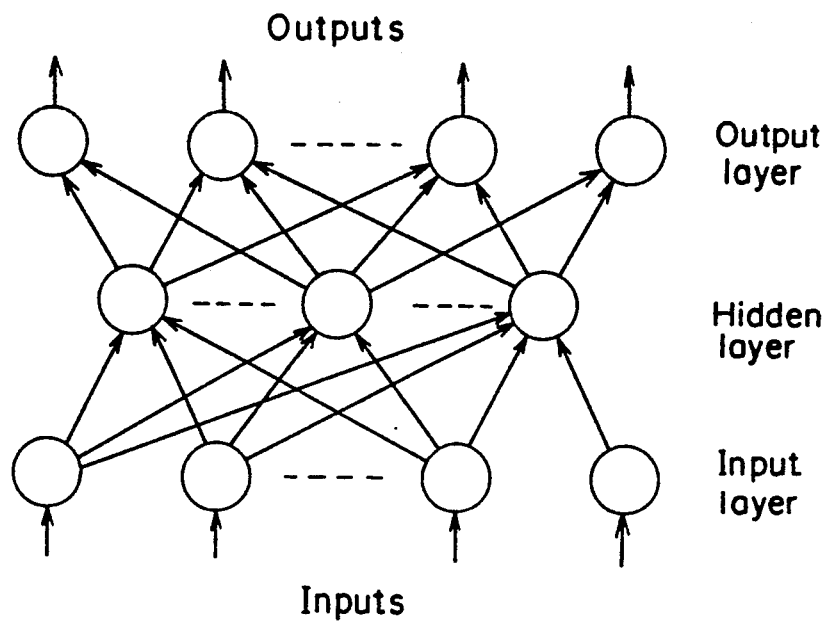
FIG. 3 is a diagram showing a neural network to be used for a predictor according to the present invention.

FIG. 3 shows an example of the parallel type neural network of employed in the present invention. The small circles denote so-called units. Each arrow line connecting two units denote a flow direction of each signal and an output of a unit connected to the rear end of an arrow line is inputted to a unit connected to the front end of the arrow line after multiplying by a weighting coefficient given to the line individually. An alignment of units in a transverse direction is called "layer". In this preferred embodiment, a neural network comprised of three layers is used. The first layer comprised of units into which inputs to the neural network are directly applied is called an "input layer". The final layer comprised of units from which respective outputs of the neural network are obtained is called an "output layer". Other layers are called "hidden layers." Accordingly, the neural network of this embodiment is comprised of the first, second and third layers which make up the input, hidden and output layers, respectively. A relation between the sum of inputs and an output in each unit is given by a function which is usually denoted a "sigmoid function".

Figure 4:
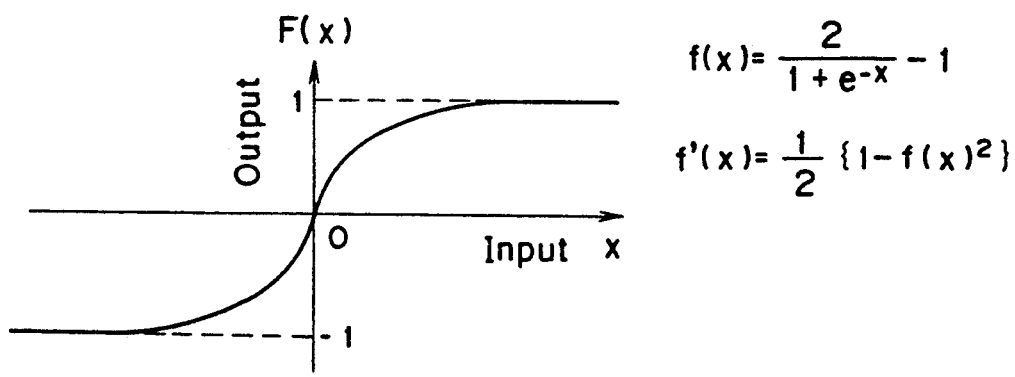
FIG. 4 is a graph showing a sigmoid function to be used in the neural network.

FIG. 4 shows an example of a sigmoid function.

Usually, the input-output characteristic of each unit belonging to the input layer is given by a linear function and, therefore, it transmits the input itself. Further, the input-output characteristic of each unit belonging to the output layer is usually given by a sigmoid function or a linear function. In this preferred embodiment, the input-output characteristic of the final layer is given by a sigmoid function as in the case of the hidden layer.

Further, in the preferred embodiment, it is assumed that there is one unit in the intermediate layer which has a unit input and a linear input-output characteristic and outputs a bias input to each unit of the final layer.

Figure 5:
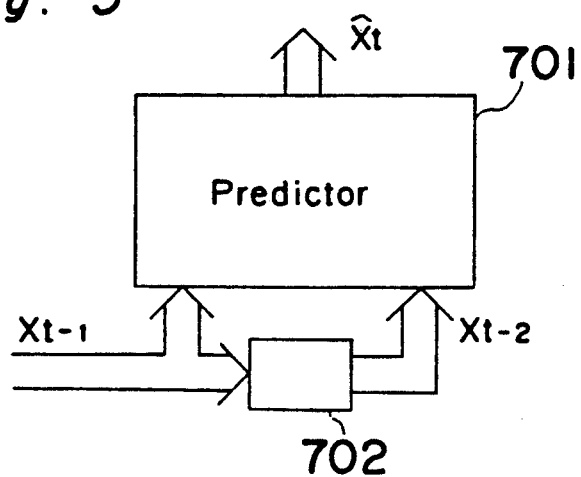
FIG. 5 is a block diagram of the predictor.

FIG. 5 shows an example of the composition of the neural network predictor for predicting $x_t^{(r)}$ from $$x_{t-2}^{(r)} \text{ and } x_{t-1}^{(r)}$$

assuming the k-th component of $x_t^{(r)}$ $$as \cdot x_{t,k}^{(r)} = (x_{t,1}^{(r)}, x_{t,2}^{(r)}, \ldots, x_{t,d}^{(r)})^T$$

Next, the estimation method for these parameters is explained.

(a) Estimation of weighting coefficients

Assuming a weighting function of connection from the f-th unit of the (u-1)-th layer to the g-th unit of the u-th layer in the state i is represented by $w_{i,f,g}^{u-1,u}$, a correction amount of the weighting coefficient in the learning iteration is given as follows.

$$\Delta w_{i,f,g}^{u-1,u} = \epsilon \frac{\partial Q^*(\lambda, \lambda')}{\partial w_{i,f,g}^{u-1,u}} \quad (23)$$

Assuming that $$\zeta_{i,j,t,\tau,k\,g}^{(r)\,u}$$

denotes a total sum of inputs to the g-th unit of the u-th layer in the state i wherein $$s_{t-\tau}^{(r)} = i_1$$

and $s_t^{(r)} = j_1$ continues k-times in the r-th learning pattern.

$$o_{i,j,t,\tau,k\,g}^{(r)\,u}$$

denotes outputs of the g-th unit of the u-th layer in the state i under conditions similar to the mentioned above and f(.) denotes a sigmoid function in each unit, the partial differential of the right side of the equation (23) is transformed as follows.

$$\frac{\partial Q^*(\lambda, \lambda')}{\partial w_{i,f,g}^{u-1,u}} = \sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i, j) \times \quad (24)$$

$$\sum_{k=1}^{\tau} \frac{\partial \log b_i(x_{t-\tau-1+k}^{(r)})'}{\partial \zeta_{i,j,t,\tau,k\,g}^{(r)\,u}} \frac{\partial \zeta_{i,j,t,\tau,k\,g}^{(r)\,u}}{\partial w_{i,f,g}^{u-1,u}}$$

$$= \sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i, j) \times$$

$$\sum_{k=1}^{\tau} \frac{\partial \log b_i(x_{t-\tau-1+k}^{(r)})'}{\partial \zeta_{i,j,t,\tau,k\,g}^{(r)\,u}} o_{i,j,t,\tau,k\,f}^{(r)\,u-1}$$

If $u \neq U$(final layer), the following equation is introduced.

$$\frac{\partial \log b_i(x_{t-\tau-1+k}^{(r)})'}{\partial \zeta_{i,j,t,\tau,k\,g}^{(r)\,u}} = \sum_{h} \frac{\partial \log b_i(x_{t-\tau-1+k}^{(r)})'}{\partial \zeta_{i,j,t,\tau,k\,h}^{(r)\,u+1}} \frac{\partial \zeta_{i,j,t,\tau,k\,h}^{(r)\,u+1}}{\partial o_{i,j,t,\tau,k\,g}^{(r)\,u}} \times \quad (25)$$

$$\frac{\partial o_{i,j,t,\tau,k\,g}^{(r)\,u}}{\partial \zeta_{i,j,t,\tau,k\,g}^{(r)\,u}}$$

$$= \sum_{h} \frac{\partial \log b_i(x_{t-\tau-1+k}^{(r)})'}{\partial \zeta_{i,j,t,\tau,k\,h}^{(r)\,u+1}} w_{i,g,h}^{u,u+1} \times$$

$$f'(\zeta_{i,j,t,\tau,k\,g}^{(r)\,u})$$

$$= \sum_{h} \frac{\partial \log b_i(x_{t-\tau-1+k}^{(r)})'}{\partial \zeta_{i,j,t,\tau,k\,h}^{(r)\,u+1}} w_{i,g,h}^{u,u+1} \times$$

$$\{1 - f(\zeta_{i,j,t,\tau,k\,g}^{(r)\,u})^2\}/2$$

$$= \sum_{h} \frac{\partial \log b_i(x_{t-\tau-1+k}^{(r)})'}{\partial \zeta_{i,j,t,\tau,k\,h}^{(r)\,u+1}} w_{i,g,h}^{u,u+1} \times$$

$$\{1 - (o_{i,j,t,\tau,k\,g}^{(r)\,u})^2\}/2$$

In the final layer U, since $$e_{t-\tau-1+k,g}^{(r)} = x_t - f(\zeta_{i,j,t,\tau,k\,g}^{(r)\,U})$$

provided that the output of the g-th unit corresponds to the g-th component of prediction error vector $e_t = x_t - \hat{x}_t$, the following equation is obtained.

$$\frac{\partial \log b_i(x_{t-\tau-1+k}^{(r)})'}{\partial \zeta_{i,j,t,\tau,k\,g}^{(r)\,U}} = \frac{\partial}{\partial \zeta_{i,j,t,\tau,k\,g}^{(r)\,U}} \left[ -\frac{1}{2} \sum_{m=1}^{d} \sum_{n=1}^{d} \sigma_i^{mn} \times \right. \quad (26)$$

$$\left. e_{t-\tau-1+k,m}^{(r)} \, e_{t-\tau-1+k,n}^{(r)} \right]$$

$$= \frac{\partial}{\partial \zeta_{i,j,t,\tau,k\,g}^{(r)\,U}} \left[ -\frac{1}{2} \sum_{m=1}^{d} \sum_{n=1}^{d} \sigma_i^{mn} \times \right.$$

$$\left. f(\zeta_{i,j,t,\tau,k\,m}^{(r)\,U}) f(\zeta_{i,j,t,\tau,k\,n}^{(r)\,U}) \right]$$

$$= \sum_{m=1}^{d} \sigma_i^{mg} f'(\zeta_{i,j,t,\tau,k\,m}^{(r)\,U}) \times f(\zeta_{i,j,t,\tau,k\,g}^{(r)\,U})$$

$$= \sum_{m=1}^{d} \sigma_i^{mg} f(\zeta_{i,j,t,\tau,k\,m}^{(r)\,U}) \times$$

$$\{1 - f(\zeta_{i,j,t,\tau,k\,g}^{(r)\,U})^2\}/2$$

$$= \sum_{m=1}^{d} \sigma_i^{mg} o_{i,j,t,\tau,k\,m}^{(r)\,U} \times$$

$$\{1 - (o_{i,j,t,\tau,k\,g}^{(r)\,U})^2\}/2$$

Accordingly, the equations (24), (25) and (26) may be rewritten by setting the following equation.

$$z_{i,j,t,\tau,k\,g}^{(r)\,u} = \frac{\partial b_i(x_{t-\tau-1+k}^{(r)})}{\partial \zeta_{i,j,t,\tau,k\,g}^{(r)\,u}}.$$

-continued $$\frac{\partial Q^*(\lambda, \lambda')}{\partial w_i^{u-1}{}_f^u{}_g'} = \sum_{r=1}^{R} c^{(r)} \sum_{t=2}^{T^{(r)}+1} \sum_{\tau=1}^{t-1} \sum_{j=1(\neq i)}^{I} p_{t,\tau}^{(r)}(i,j) \times \quad (24')$$

$$\sum_{k=1}^{T} z_{i,j,t,\tau,k}^{(r)}{}_g^{u'} o_{i,j,t,\tau,k}^{(r)}{}_f^{u-1}$$

$$z_{i,j,t,\tau,k}^{(r)}{}_g^{u'} = \sum_h z_{i,j,t,\tau,k}^{(r)}{}_h^{u+1} h' w_{i g}^{u}{}_h^{u+1'} \times \{1 - (o_{i,j,t,\tau,k}^{(r)}{}_g^{u'})^2\}/2 \quad (25')$$

$$z_{i,j,t,\tau,k}^{(r)}{}_g^{U'} = \sum_{m=1}^{d} \sigma_i^{mg} o_{i,j,t,\tau,k}^{(r)}{}_m^{U'} \times \{1 - (o_{i,j,t,\tau,k}^{(r)}{}_g^{U'})^2\} \quad (26')$$

Thus, the point which gives a local maximum value with respect to the weighting coefficient $w_i^{\mu-1}{}_f^{\mu}{}_g'$ of the state i given by $Q^*(\lambda,\lambda')$ is estimated according to the following steps in the iteration of parameter estimation.

Step(w1): Providing initial values of $w_i^{\mu-1}{}_f^{\mu}{}_g'$ with respect to all of possible values of u,f and g.
Step(w2): Calculating $L_1 = Q^*(\lambda,\lambda')$
Step(w3): Calculating $$z_{i,j,t,\tau,k}^{(r)}{}_g^{u'}$$

with respect to all possible values of r, j, t, $\tau$, k, g and u according to the equations (26') and (25). With respect to u, it is calculated in the order of u=U, U-1, ..., 1.

Step(w4): Calculating $\Delta w_i^{\mu-1}{}_f^{\mu}{}_g'$ with respect to all possible values of u, f and g.
Step(w5): Replacing $w_i^{\mu-1}{}_f^{U}{}_g' + \Delta w_i^{\mu-1}{}_f^{\mu}{}_g'$ with $w_i^{\mu-1}{}_f^{\mu}{}_g'$.
Step(w6): Calculating $L_2 = Q^*(\lambda,\lambda')$
Step(w7): Completing the estimation process (of one time) for the weighting coefficient in the state i by setting $w_i^{\mu-1}{}_f^{\mu}{}_g'$ to $w_i^{\mu-1}{}_f^{\mu}{}_g$ if the ratio of improvement of $L_2$ to $L_1$ becomes smaller than a predetermined threshold value. If said ratio is larger than the threshold value, the process returns to step(w3) after setting $L_2$ to $L_1$.

The algorithm mentioned above is employed for searching a peak of a target function in a space constituted by $\lambda$ with use of the steepest descent method as one of iteration methods.

Namely, in each stage of the iteration calculation, $\lambda$ is renewed in such a direction that the value of the target function $P(X^{(1)}, \ldots, X^{(R)}|\lambda)$ becomes larger than the most previous one and, accordingly, renewal of $\lambda$ to the vector series of R vectors is made by one time.

Contrary to the method, there is known a method called "probability approximation method" wherein a peak higher than a local peak may be obtained. In the algorithm, the probability direction is used in which $P(X^{(r)}|\lambda)$ increases with respect to each $X^{(r)}$. Namely, $\lambda$ is renewed R times with respect to the vector series of R vectors. In this case, $\lambda$ is not always renewed in such a direction at each stage of R renewals in that the target function $P(X^{(1)}, \ldots, X^{(R)}|\lambda)$ increases but, when averaged over R renewals, $\lambda$ is renewed in the above direction.

The estimation method in this case is made according to the following steps.

An auxiliary function to $x^{(r)}$ is introduced by the following equation $$Q_r(\lambda, \lambda') = \sum_{s^{(r)}} P(X^{(r)}, S^{(r)}|\lambda) \log P(X^{(r)}, S^{(r)}|\lambda')$$

(w1'): Providing initial values of $w_i^{\mu-1}{}_f^{\mu}{}_g'$ with respect to all possible values of u, f and g.
(w2'): Calculating $$L_1 = \sum_r P(X^{(r)}|\lambda)^{-1} Q_r(\lambda, \lambda')$$

(w3'): Executing steps (w4) and (w5) with respect to r=1 to R.
(w4'): Calculating $$z_{i,j,t,\tau,k}^{(r)}{}_g^{u'}$$

with respect to all possible values of j, t, $\tau$, k, g and u according to the equations (26') and (25'). With respect to u, it is calculated in the reverse order of u=U, U-1, ..., 1.

(w5'): Calculating $\Delta w_i^{\mu-1}{}_f^{\mu}{}_g'$ with respect to all possible values of u, f and g according to the equations (15') and (14) and replacing $(w_i^{\mu-1}{}_f^{\mu}{}_g' + \Delta w_i^{\mu-1}{}_f^{\mu}{}_g')$ with $w_i^{\mu-1}{}_f^{\mu}{}_g'$ with respect to all possible values of u, f and g.

(w6'): Calculating $$L_2 = \sum_r P(X^{(r)}|\lambda)^{-1} Q_r(\lambda, \lambda').$$

(w7'): Completing the estimation process (of one time) for the weighting coefficient in the state i by setting $w_i^{\mu-1}{}_f^{\mu}{}_g'$ to $w_i^{\mu-1}{}_f^{\mu}{}_g$ if the ratio of improvement of $L_2$ to $L_1$ becomes smaller than the predetermined threshold value. If said ratio does not become smaller than the threshold value, the process returns to step(w3') after setting $L_2 L_1$.

(b) Estimation of Variance-covariance matrix

Noticing $\sigma_{imn} = \sigma_{inm}$ and $\sigma_i^{mn} = \sigma_i^{nm}$, accordingly $A_{imn} = A_{inm}$ and $A_i^{mn} = A_i^{nm}$ which are defined as cofactors of the former, using $$|\Sigma_i| = \sum_{m=1}^{d} \sigma_{imn} A_{imn'} \quad |\Sigma_i^{-1}| = \sum_{m=1}^{d} \sigma_i^{mn} A_i^{mn}$$

$$\sigma_i^{mn} = \frac{A_{inm}}{|\Sigma_i|}, \quad \sigma_{imn} = \frac{A_i^{nm}}{|\Sigma_i^{-1}|}$$

and since $$\frac{\partial \sigma_i^{mn'}}{\partial \sigma_{imn'}} = \frac{\partial}{\partial \sigma_{imn'}} \frac{A_{imn'}}{|\Sigma_i'|} = -\frac{A_{imn'}^{'2}}{|\Sigma_i'|^2} = -(\sigma_i^{mn'})^2$$

$$\frac{\partial \log |\Sigma_i'^{-1}|}{\partial \sigma_{imn'}} = \frac{\partial \log |\Sigma_i'^{-1}|}{\partial \sigma_i^{mn'}} \frac{\partial \sigma_i^{mn'}}{\partial \sigma_{imn'}} = -\sigma_{imn'} (\sigma_i^{mn'})^2$$

the following relation is obtained.

$$\frac{\partial}{\partial \sigma_{imn'}} \log b_i(x_{t-\tau-1+k}) = \frac{1}{2} \frac{\partial}{\partial \sigma_{imn'}} \log |\Sigma_i'^{-1}| -$$

$$\frac{1}{2} e_{t-\tau-1+k,m}^{(r)} e_{t-\tau-1+k,n}^{(r)} \frac{\partial \sigma_i^{mn'}}{\partial \sigma_{imn'}}$$

$$= -\frac{1}{2} \sigma_{imn'} (\sigma_i^{mn'})^2 +$$

-continued
$$\frac{1}{2} e^{(r)}_{t-\tau-1+k,m} e^{(r)}_{t-\tau-1+k,n} (\sigma_i^{mn})^2$$

Accordingly, the following equation is obtained.

$$0 = \frac{\partial Q^*(\lambda, \lambda')}{\partial \sigma_{imn}'} \times 2 =$$

$$\sum_{r=1}^{R} c^{(r)} \sum_{t=2}^{T^{(r)}+1} \sum_{\tau=1}^{t-1} \sum_{j=1(\neq i)}^{I} p^{(r)}_{t,\tau}(i,j) \times$$

$$\sum_{k=1}^{\tau} (-\sigma_{imn}' + e^{(r)}_{t-\tau-1+k,m} e^{(r)}_{t-\tau-1+k,n}) \times (\sigma_i^{mn})^2$$

Thus, the reestimation formula of $\Sigma_i$ is obtained as follows;

$$\Sigma_i = \frac{\sum_{r=1}^{R} c^{(r)} \Sigma_{i,num}(r)}{\sum_{r=1}^{R} c^{(r)} \Sigma_{i,denom}(r)} \quad (27)$$

wherein
$$\Sigma_{i,num}(r) = \quad (28)$$
$$\sum_{t=2}^{T^{(r)}+1} \sum_{\tau=1}^{t-1} \sum_{j=1(\neq i)}^{I} p^{(r)}_{t,\tau}(i,j) \times e^{(r)}_{t-\tau-1+k} e^{(r)T}_{t-\tau-1+k}$$

and
$$\Sigma_{i,denom}(r) = \sum_{t=2}^{T^{(r)}+1} \sum_{\tau=1}^{t-1} \sum_{j=1(\neq i)}^{I} p^{(r)}_{t,\tau}(i,j)\tau \quad (29)$$

The actual calculation procedure for the parameter estimation is follows.

Upon forming a mode $\lambda^v$ corresponding to the word V, it is assumed that the pattern $$X^{(r)} = x_1^{(r)}, \ldots, x_T^{(r)}$$

is given as training patterns beforehand wherein $r=1$ to R, $x_t^{(r)}$ t-th feature vector of the pattern r and $T^{(r)}$ is a number of frames of the pattern r.

It is further assumed that $j > i$, $I = f$, $i = 1$ to I-1, $j = 2$ to I and $d_i(\tau) = \gamma_i^{\tau-1}(1-\gamma_i)$.

setting initial values
(1) Providing suitable initial values to $$\lambda_i = \{(a_{ij})_{j=1}^{j=I}, \gamma_i, W_i, \Sigma_i\}$$

with respect to $i=1$ to I.

Estimation of transition probability
(2) Executing step (3) with respect to $r=1$ to R.
(3) Calculating $$p^{(r)}_{t,\tau}(i,j), c^{(r)}$$

with respect to $t=2$ to $T^{(r)}+1$, $\tau=1$ to t-1, $i=1$ to I-1 and $j=2$ to I according to the equations (16) to (18) assuming $\lambda = \{\lambda_i\}$.

Further calculating $a_{ij,num}(r)$ and $a_{ij,denom}(r)$ according to the following equation.

$$a_{ij,num}(r) = \sum_{t=2}^{T^{(r)}+1} \sum_{\tau=1}^{t-1} p^{(r)}_{t,\tau}(i,j)$$

-continued
$$a_{ij,denom}(r) = \sum_{t=2}^{T^{(r)}+1} \sum_{\tau=1}^{t-1} \sum_{j=1(\neq i)}^{I} p^{(r)}_{t,\tau}(i,j)$$

(4) Calculating estimation values of $a_{ij}$ with respect to $i=1$ to I-1 and $j=2$ to I according to the equation (19). Namely, $$a_{ij} = \sum_{r=1}^{R} c^{(r)} a_{ij,num}(r) / \sum_{r=1}^{R} c^{(r)} a_{ij,denom}(r)$$

(5) Replacing $a_{ij}$ with $\bar{a}_{ij}$ in the equation $$\lambda_i = \{(a_{ij})_{j=2}^{j=I}, \gamma_i, W_i, \Sigma_i\}$$

with respect to $i=1$ to I-1.

Estimation of parameters related to probability distribution of tribus length of state
(6) Executing step(7) with respect to $r=1$ to R.
(7) Calculating $$p^{(r)}_{t,\tau}(i,j)$$

and $c^{(r)}$ with respect to $t=2$ to $T^{(r)}+1$, $\tau=1$ to t-1, $i=1$ to I-1 and $j=2$ to I according to the equations (16) to (18) assuming $\lambda = \{\lambda_i\}$.

Further calculating $\gamma_{i,num}(r)$ and $\gamma_{i,denom}(r)$ according to the following equation $$\gamma_{i,num}(r) = \sum_{t=2}^{T^{(r)}+1} \sum_{\tau=1}^{t-1} \sum_{j=1(\neq i)}^{I} p^{(r)}_{t,\tau}(i,j)(\tau - 1)$$

$$\gamma_{i,denom}(r) = \sum_{t=2}^{T^{(r)}+1} \sum_{\tau=1}^{t-1} \sum_{j=1(\neq i)}^{I} p^{(r)}_{t,\tau}(i,j)\tau$$

(8) Calculating estimation formula of $\gamma_i$ with respect to $i=1$ to I according to the equation (20) as follows.

$$\gamma_i = \sum_{r=1}^{R} c^{(r)} \gamma_{i,num}(r) / \sum_{r=1}^{R} c^{(r)} \gamma_{i,denom}(r)$$

(9) Replacing $\gamma_i$ with $\bar{\gamma}_i$ in the equation $$\lambda_i = \{(a_{ij})_{j=2}^{j=I}, \gamma_i, W_i, \Sigma_i\}$$

with respect to $i=1$ to $I-1$.

Estimation of weighting coefficients
(10) Executing steps (11) and (12) with respect to $r=1$ to R.
(11) Calculating $$p^{(r)}_{t,\tau}(i,j)$$

and $c^{(r)}$ with respect to $t=2$ to $T^{(r)}+1$, $\tau=1$ to $t-1$, $i=1$ to $I-1$ and $j=i$ to I assuming $\lambda = \{\lambda_i\}$.

(12) Estimation of weighting coefficients of the neural network is made by executing steps (w1) to (w8) or (w1') to (w7') with respect to $i=1$ to $I-1$. The estimation value of the weighting coefficient from the m−th unit of the (u−1)−th layer to the u-th unit of the n-th unit is defined as $\bar{w}_i{}^{u-1}{}_m{}^u{}_n$.

(13) Replacing $w_i{}^{u-1}{}_m{}^u{}_n$ (for all u, m and n) in the equation $$\lambda_i = \{(a_{ij})_{j=1}^{j=1}, \gamma_i, W_i, \Sigma_i\}$$

with respect to i=1 to I-1.

Estimation of Variance-covariance matrix.

(14) Executing step(15) with respect to r=1 to R.

(15) Calculating $$p_{t,\tau}^{(r)}(i,j)$$

and $c^{(r)}$ with respect to t=2 to $T^{(r)}+1$, $\tau=1$ to t-1, i=1 to I-1 and j=2 to I according to the equations (16) to (18) assuming $\lambda=\{\lambda_i\}$.

Further calculating the following equation (of the equations (28) and (29)).

$$\Sigma_{i,num}(r) = \sum_{t=2}^{T^{(r)}+1} \sum_{\tau=1}^{t-1} \sum_{j=1(\neq i)}^{I} p_{t,\tau}^{(r)}(i,j) \times e_{t-\tau-1+k}^{(r)} e_{t-\tau-1+k}^{(r)}{}^T$$

$$\Sigma_{i,denom}(r) = \sum_{t=2}^{T^{(r)}+1} \sum_{\tau=1}^{t-1} \sum_{j=1(\neq i)}^{I} p_{t,\tau}^{(r)}(i,j)\tau$$

(16) Calculating the estimation formula of $\Sigma_i$ with respect to i=1 to I according to the equation (27).

$$\Sigma_i = \sum_{r=1}^{R} c^{(r)} \Sigma_{i,num}(r) / \sum_{r=1}^{R} c^{(r)} \Sigma_{i,denom}(r)$$

(17) Replacing $\Sigma_i$ with $\Sigma_i$ in the equation $$\lambda_i = \{(a_{ij})_{j=1}^{j=2}, \gamma_i, a_i, \Sigma_i\}$$

with respect to i=1 to I-1.

Evaluation of degree of improvement of parameters

(18) Calculating $$L_2 = \sum_{r=1}^{R} \{\log P(X^{(r)}|\lambda)\} T^{(r)}$$

assuming $\lambda=\{\lambda_i\}$.

(19) If $|L_1-L_2|/L_1 > \delta$, the process returns to step (2) after setting $L_1=L_2$. Otherwise, the process is completed.

In step(19), $\delta$ is a small positive number suitable for determining the width of convergence. If $\delta$ is too small, inconveniences such as an excessive convergence time, overlearning and the like are caused, although the accuracy in the parameter estimation is enhanced. The overlearning is caused for the following reason. Though each parameter can be optimized more and more to learning samples by repeating the learning iteration, this is true only for the learning sample, and parameters are not always optimized to samples other than the learning samples. Of course, in the case where there are enough learning samples and the characteristic of the population is well reflected in them, the overlearning does not occur. If $\delta$ is set at a relatively large value, earlier convergence is obtained but the accuracy is lowered. Accordingly, if the value of $\delta$ is set at a relatively large value, earlier convergence is obtained but the accuracy is lowered. Accordingly, the value of $\delta$ is to be set at a suitable value for the actual situation to be trained.

FIG. 1 shows a block diagram of the HMM generating system according to the present invention.

In this preferred embodiment, $a_{ij}=1$ for j=i+1 and $a_{ij}=0$ for j≠i+1 are assumed.

Firstly, the functions of respective sections in the system enumerated below are explained.

801 ... Feature extraction section which transforms voice signals of respective training words r=1 to R into a series of feature vectors $$X^{(r)} = x_1^{(r)}, x_2^{(r)}, \ldots, x_{T^{(r)}}^{(r)}.$$

802 ... Word pattern memory section which stores a plurality of the feature vector series (word pattern) corresponding to the training words for forming a model $\lambda$(in this embodiment the number of them is R).

803 ... Buffer memory which temporarily stores one of the word patterns stored in the word pattern memory 802.

804 ... Partial probability calculation section which calculates $$p_{t,\tau}^{(r)}(i,j)$$

and $c^{(r)}$ prior to the estimation of parameters in the state i.

805 ... Calculation section of the expected value of the length of the tribus which calculates expected values of lengths of tribuses $\tau$ and $\tau-1$ in the state i regarding paths. These are the denominator and numerator of the equation (20) for the transition probability. The expected value of $\tau$ obtained also becomes the denominator of the equation (28) which gives the variance-covariance matrix of error signals.

811 ... Calculation section of error variance-covariance matrix numerator which calculates the equation (29).

813 ... First parameter (weighting coefficient) calculation section which executes the calculation from step(w1) to step(w9) to obtain the estimation value $\overline{w}_i^{\mu-1}\mu_g$ of the weighting coefficient.

First cumulative sum calculation section which calculates a cumulative sum of values calculated regarding each training word by the tribus length calculation section 805.

812 ... second simulative sum calculation section which calculates a cumulative sum of values calculated regarding each training word by the error variance-covariance matrix numerator calculation section 811.

807 ... second parameter calculation section which calculates a ratio of the numerator and denominator of each parameter calculated by the first and second cumulative sum calculation section 806 and 812, respectively, and thereby, obtains estimation values of the transition probability $\gamma_i$ of the state i and variance-covariance matrix $\Sigma_i$ of the estimation error.

808 ... Parameter memory for storing estimated parameters.

809 ... Total probability calculation section which calculates a total sum of the probabilities $P(X^{(r)}|\lambda)$ for all r based on estimation values of parameters stored in the parameter memory section 809.

810 ... Total probability memory for storing the total probability calculated by the section 809.

816 ... Control section which executes a setting of various quantities for respective sections and various commands in relation to respective sections.

In this system, the formation of the model $\lambda^v$ corresponding to the word v is made as follows.

Voice signals obtained by pronouncing the word v R times are transformed into R patterns as feature vector series by the feature extraction section 801 and, then, R patterns are stored in the word pattern memory 802. By a read command for the learning word from the control section 816, the r-th word pattern $X^{(r)}(r=1,$ to R) is read out from the word pattern memory 802 and is stored in the buffer memory 803 temporarily. Then, t and t obtained in the parameter calculation are supplied to the buffer memory 803 as frame setting signals from the control section 816 and the partial probability calculation section 804 calculates $$p^{(r)}_{i,\tau}(i,j)$$

and $c^{(r)}$ with respect to the corresponding frame of the word pattern $X^{(r)}$ stored in the buffer memory 803. The calculation section of the expected value of the tribus length 805 calculates the denominator and numerator of $\gamma_i$ based on the values obtained. The values $\lambda_i = \{\lambda_i, W_i, \Sigma_i\}$ stored as parameters in the state i in the parameter memory 808 are used for parameters included in the denominator and numerator upon the above calculation.

The first and second cumulative sum calculation sections 806 and 812 calculate respective cumulative sums of the denominators and numerators with respect to the training word patterns $X^{(r)}(r=1$ to R), respectively. The parameter calculation section 807 calculates a new estimation value of the transition probability $\gamma_i$ of the state i by taking a ratio of the cumulative sum of the denominators to that of the numerators which have been calculated with respect to the state i of the training word pattern X(r) (r=1 to R). This is effected for all i from 1 to I. The parameter memory 808 stores the new estimation values of the transition probability as renewed parameters $$\lambda = \{\lambda_i^v\}$$

corresponding to the word v in place of the old ones. The total probability calculation section 809 calculates the total probability for all training words using renewed parameters $\lambda$ in the manner mentioned above and compares it with the total probability stored in the total probability memory 810. The result of the comparison is sent to the control section 816 and the new total probability obtained is stored in the memory 810. The control section 816 suspends the parameter estimation calculation if an improvement effect is recognized from the result of the comparison, namely if the difference between the new one and the old one becomes smaller than the predetermined threshold value. If it is larger than the threshold value, the estimation of variance-covariance of the estimation error is executed according to the equation(28).

Namely, by a read command for the learning word from the control section 816, the r-th word pattern $X^{(r)}(r=1$ to R) is read out from the word pattern memory 802 and is stored in the buffer memory 803 temporarily. Then, t and t obtained in the parameter calculation are supplied to the buffer memory 803 as frame setting signals from the control section 816 and the partial probability calculation section 804 calculates $$p^{(r)}_{i,\tau}(i,j)$$

and $c^{(r)}$ with respect to the corresponding frame of the word pattern $X^{(r)}$ stored in the buffer memory 803. The calculation section of the expected value of the tribus length 805 calculates the denominator of the variance-covariance of estimation error based on the values obtained and the numerator thereof is calculated by the calculation section 811. At that time, as parameters included in the denominator and numerator, values $\lambda_i = \{\lambda_i, W_i, \Sigma_i\}$ stored as parameters in the state i in the parameter memory 808 are used. The first cumulative sum calculation section 806 calculates the cumulative sum of the denominators regarding all training word patterns $X^{(r)}$ (r=1 to R) and the second one 812 calculates that of the numerators regarding for them. The parameter calculation section 807 calculates new estimation values of the variance-covariance of the estimation error of the state i by taking a ratio of the cumulative sum of the denominators to that of the numerators which have been calculated with respect to the state i of the training word pattern $X^{(r)}$ (r=1 to R). This is repeated for all i from 1 to I. The parameter memory 808 stores the new estimation values of the variance-covariance of the estimation error as renewed parameters $$\lambda = \{\lambda_i^v\}$$

corresponding to the word v in place of old ones.

The total probability calculation section 809 calculates the total probability for all training words and compares it with the total probability having been calculated with use of latest parameters and stored in the memory 810. The result of the comparison is sent to the control section 816 and the new total probability obtained is stored in the memory 810. The control section 816 suspends the parameter estimation calculation if an improvement effect is recognized based on the result of the comparison. If the result indicates that the difference between the new one and the old one is still larger than the predetermined threshold value, the estimation of the weighting coefficients $W_i$ is executed as follows.

Responsive to a read command for the learning word from the control section 816, the r-th word pattern $X^{(r)}(r=1$ to R) is read out from the word pattern memory 802 and is stored in the buffer memory 803 temporarily. Then, t and $\tau$ obtained to the buffer memory 803 as frame setting signals from the control section 816 and the partial probability calculation section 804 calculates $$p^{(r)}_{i,\tau}(i,j)$$

and $c^{(r)}$ with respect to the corresponding frame of the word pattern $X^{(r)}$ memorized in the buffer memory 803. The parameter calculation section 813 calculates the weighting coefficients based on the values obtained. The values $\lambda_i = \{\gamma_i, W_i, \Sigma_i\}$ stored as parameters in the state i in the parameter memory 808 are used for parameters included in the parameter calculation upon the above calculation. This is repeated with respect to i=1 to I.

The parameter memory 808 stores the new estimation values of the prediction coefficients as renewed parameters $$\lambda = \{\lambda_i^\nu\}$$

corresponding to the word v in place of the old ones. The total probability calculation section 809 calculates the total probability for all training words using renewed parameters λ in the manner mentioned above and compares it with the total probability stored in the total probability memory 810. The result of the comparison is sent to the control section 816 and the new total probability obtained is stored in the total probability memory 810. The control section 816 suspends the parameter estimation calculation if an improvement effect is recognized from the result of the comparison, namely if the difference between the new one and the old one become smaller than the predetermined threshold value. If it is larger than the threshold value, the calculation of the transition probability is executed again.

By repeating these calculations until the difference becomes smaller than the predetermined threshold value, the parameters $$\lambda = \{\lambda_i^\nu\}$$

converge to respective constant values. These parameters thus converged are those to be sought.

In other words, the model is thus obtained.

Method and Apparatus for speech Recognition

Next, the method and apparatus for recognizing actual input speech using the model mentioned above is explained.

A so-called exact solution is obtained as a result of recognition v which gives the maximum value of $P(X|M^\nu)$ calculating $P(X|M^\nu)$ for v from 1 to V when unknown input pattern X is inputted. This is obtained by replacing $X^{(r)}$ with X and M with $M^\nu$ in the process for calculating the probability $c^{(r)}=P(X^{(r)}|M)$ of the model M corresponding to the input pattern $X^{(r)}$ upon forming the model mentioned above.

Hereinafter, a method for obtaining an approximate solution corresponding to the equation(2') is explained.

Assuming $\phi(i,t)$ as the maximum cumulative probability at the state i at time t, the following recurrence formula is obtained corresponding to the equation(2').

$$\phi(i+1,t) = \max_{\tau \leq t-1} [\phi(i,t-\tau)f_{t,\tau}(i)] \quad (30)$$

wherein $$f_{t,\tau}(i) = d_i(\tau) \prod_{K=1}^{\tau} b_{ik}(x_{t-\tau-1+k})$$

Accordingly, by calculating $\phi(i,t)$ for i=1 to I-1 and for t=2 to T+1 in turn, $\phi(I,T+1)$ becomes the maximum probability of the model λ (model M) to the input pattern X.

Since it becomes necessary to calculate the equation(30) for all combinations of τ=2 to t−1 and i=1 to I with respect to every frame t(=1 to T), the volume of the calculations becomes too large.

However, the calculation volume can be reduced by utilizing past calculation values. Here, the following quantity is defined for later discussion.

$$B(i,t,\tau) = \prod_{k=1}^{\tau} b_{ik}(x_{t-\tau-1+k}) \quad (31)$$

From this, the following relations are obtained.

$$\begin{aligned} B(i,t,1) &= b_i(x_{t-1}) \\ B(i,t,2) &= B(i,t,1)b_i(x_{t-2}) \\ B(i,t,3) &= B(i,t,2)b_i(x_{t-3}) \\ &\vdots \\ B(i,t,\tau) &= B(i,t,\tau-1)b_i(x_{t-\tau}) \end{aligned} \quad (32)$$

Also, $d_i(\tau)$ is stored in a table in advance by calculating it for t=1 to T. In this case, the equation (31) can be calculated in the following manner after setting B(i,t,0)=1.

Calculating the following equation(33) for with respect to τ=1 to t−1.

$$B(i,t,\tau) = B(i,t,\tau-1)b_i(x_{t-\tau})$$

$$\eta(\tau) = \phi(i,t-\tau)B(i,t,\tau)d_i(\tau) \quad (33)$$

(2) $\Phi(i+1,t) = \max_\tau [\eta(\tau)]$

Figure 6:
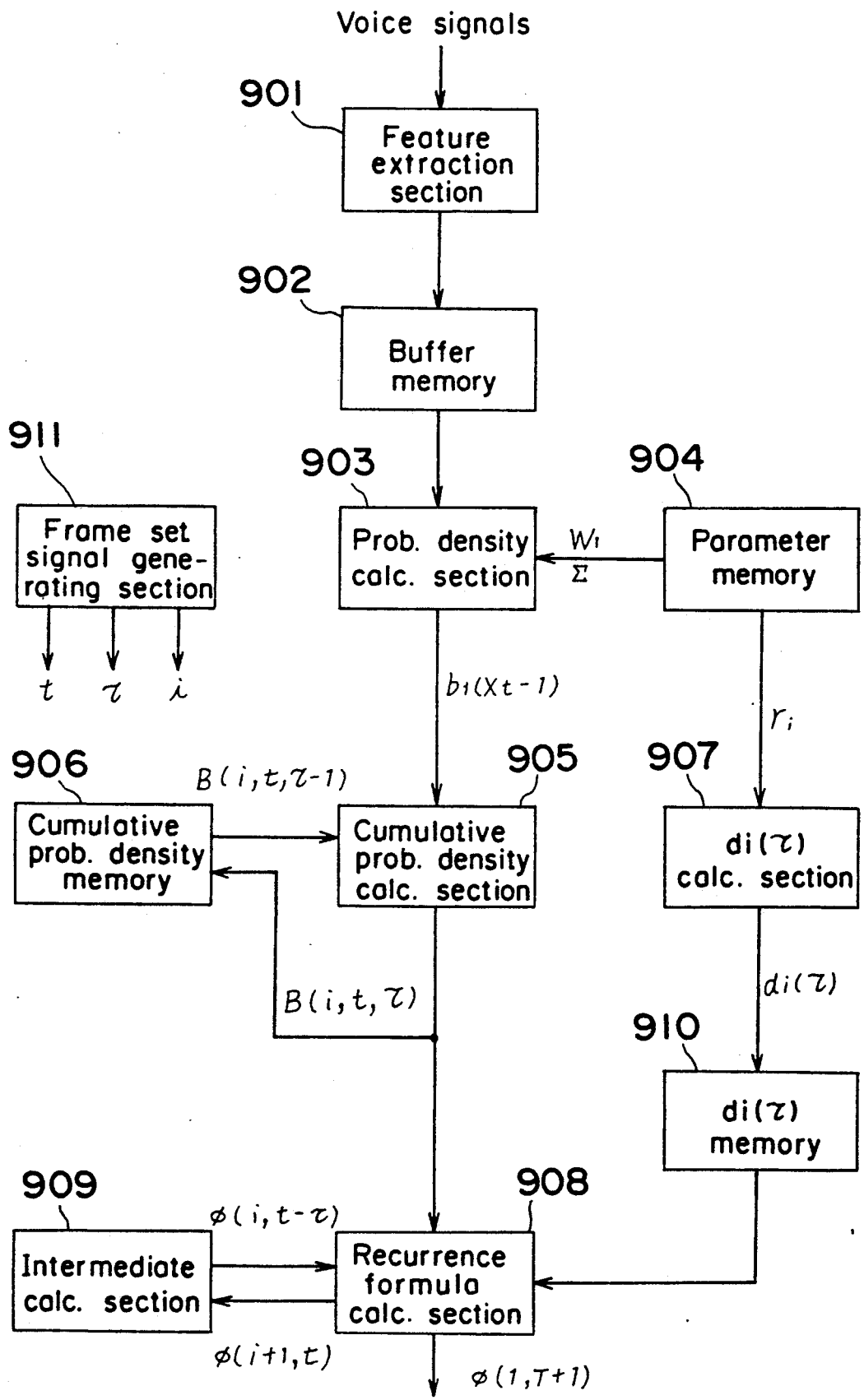
FIG. 6 is a block diagram of the probability calculating apparatus for calculating a generation probability of an unknown input pattern obtained from the model according to the present invention.
Figure 7:
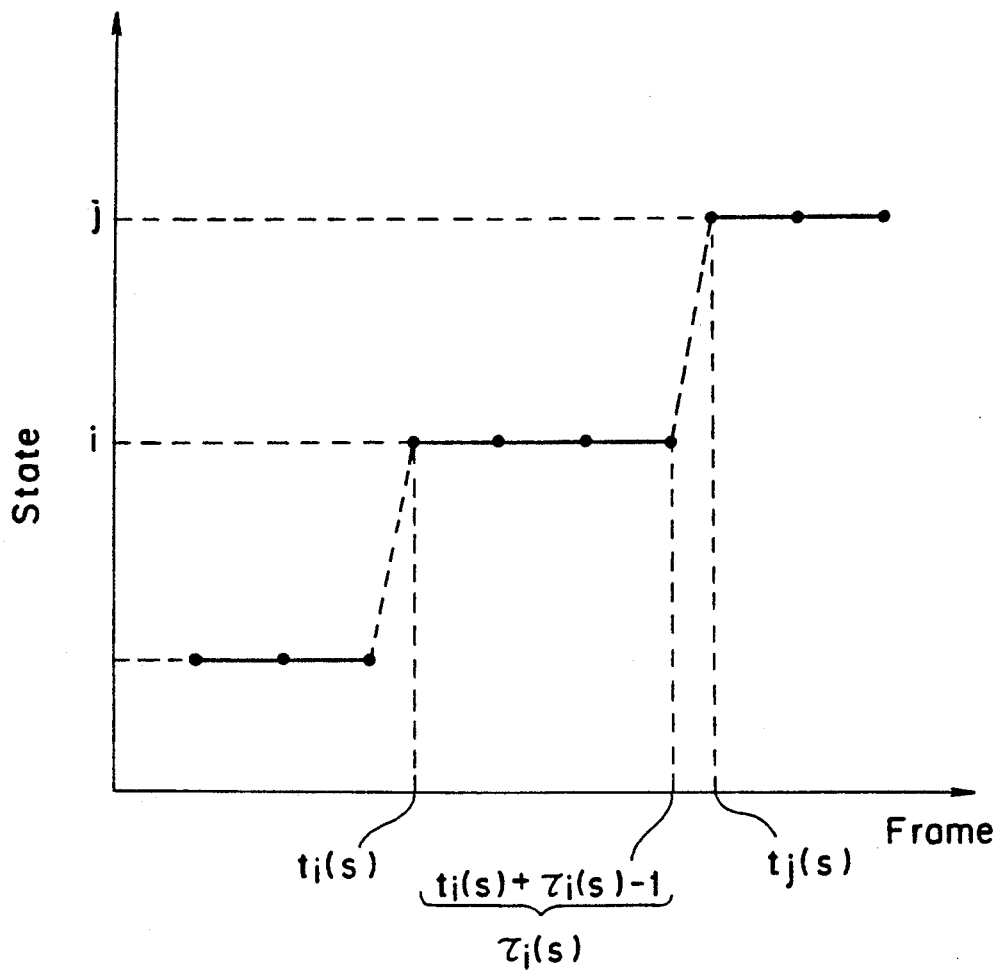
FIG. 7 is a trelis line graph for showing the concept employed in the HMM according to the present invention.
Figure 9:
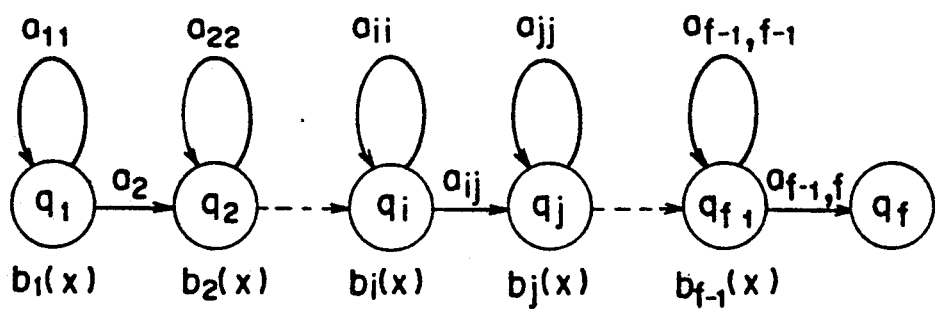
FIG. 9 is a diagram showing a conventional HMM.
Figure 8:
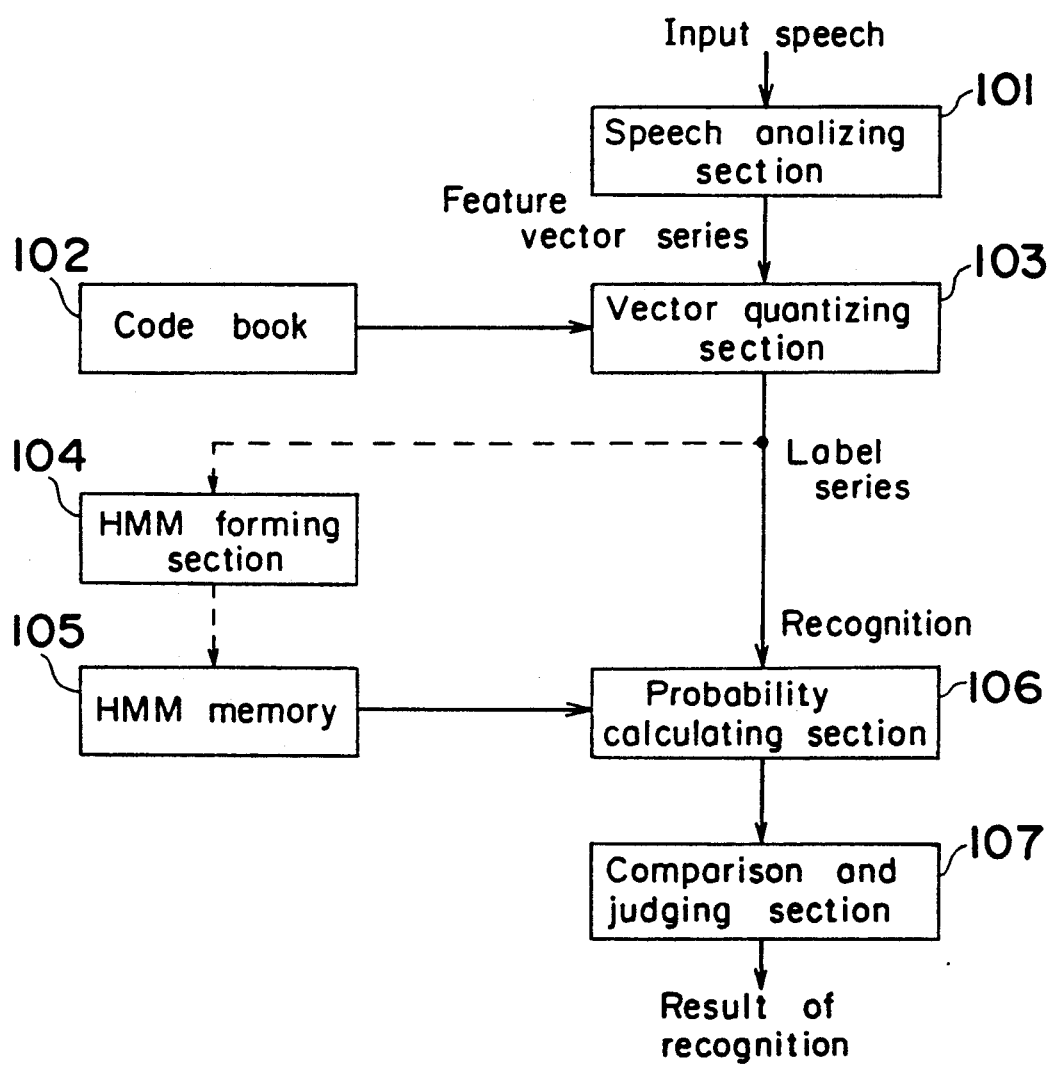
FIG. 8 is a block diagram of a conventional speech recognition apparatus.
Figure 10A:
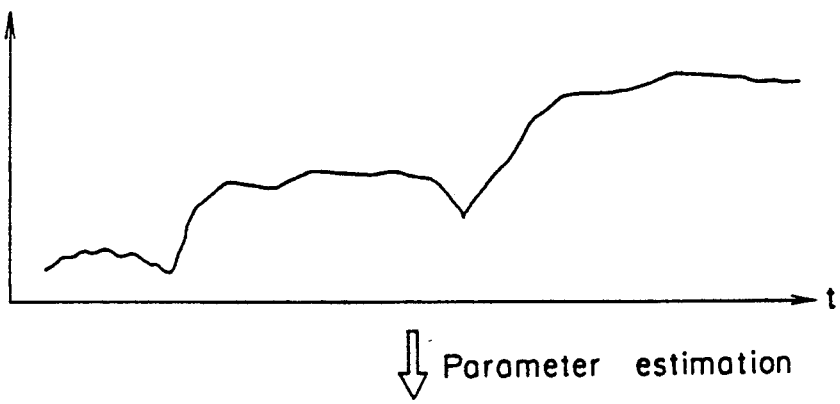
FIG. 10 is an explanatory view for showing vectors obtained by the conventional HMM.
Figure 10B:
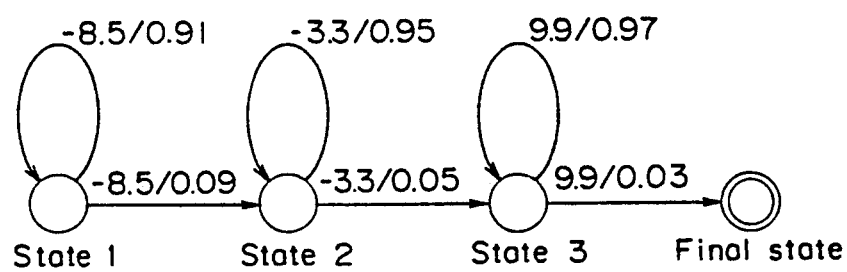
Figure 10C:
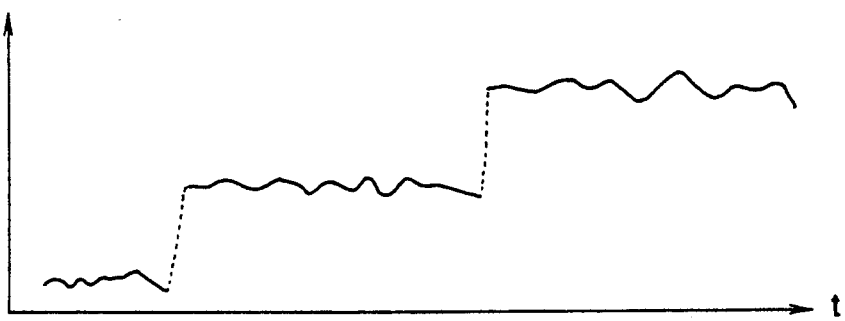

FIG. 6 is a block diagram of a preferred embodiment according to the principle mentioned above.

Functions of the respective sections enumerated below are as follows.

901 ... Feature extraction section which transforms input voice signals into a series of feature vectors $x_1, x_2, \ldots, x_T$.

902 ... Buffer memory for temporarily storing the series of feature vectors.

903 ... Calculation section for the generation probability of the vector frame which calculates the probability density $b_{i\tau}(x_{t-1})$ of a prediction error $x_{t-1}$ in a frame t−1.

904 ... Parameter memory which stores parameters of the probability density function necessary for calculation of the probability density. Namely, it stores $\gamma_i$, $W_i$ and $\Sigma_i$ in the state i=1 to I-1.

905 ... Cumulative probability density calculation section which calculates $B(i,t,\tau)$ according to the equation(32).

907 ... Calculation section of the probability density of state holding time which calculates the probability density $d_i(\tau)$ for τ=1 to T at which the tribus length of the state i becomes τ using the parameters stored in the parameter memory 904. The probability density $d_i(\tau)$ calculated is stored in a memory 910.

906 ... Cumulative probability density memory which stores results calculated by the calculation section 905 in turn. Thereby, the calculation of the equation(33) is made by reading out the contents stored in the calculation section 905 in a recurrent manner.

908 ... Recurrence formula calculation section which reads out the contents of the memory 910 for $d_i(\tau)$ calculated and calculates the equation(31) for i=1 to I and t=1 to T+1 to obtain $\phi(I+1,T+1)$ by executing the above steps(1) and (2) using the contents read out together with the outputs from the cumulative probability density calculation section 910.

909 . . . Memory for the intermediate cumulative probability density which stores each intermediate cumulative probability density $\phi(i,t)$ calculated by the recurrence formula calculation section according to the equation(31) in turn. The stored intermediate cumulative probability density used for calculating the remaining recurrence formula in the recurrence formula calculating section 908.

911 . . . Frame set signal generating section which sets the frame number t, state number i and the length $\tau$ of the tribus of the state $q_i$ in turn. These values of i, t and $\tau$ are supplied to respective sections for executing processes mentioned above.

The final result $\phi(I, T+1)$ obtained gives the probability density of generation of the vector series $x_1, x_2, \ldots, x^T$ according to the model $\lambda$.

The recognition of a word speech is carried out in the following manner in the apparatus.

Assume that words to be recognized are v=1 to V and each model $\lambda^v$ is prepared for each word v. When it is assumed that $\phi^v(I, T+1)$ indicates $\phi(I, T+1)$ obtained for the model $\lambda^v$ according to the processes mentioned above, the result of recognition is obtained as follows.

$$v = \underset{v=1\ldots V}{\operatorname{argmax}}\ [\phi^v(I,T+1)] \qquad (41)$$

The calculation of the recurrence formula (30) can be simplified by taking the logarithm of both sides thereof in which the equations (30), (32) and (33) are transformed to equations (30'), (32') and (33') as follows.

$$\Phi(i+1,t) = \max_{\tau \leq t-1}\ [\Phi(i,t-\tau) + \log f_{t,\tau}(i)] \qquad (30')$$

$$\Gamma(i,t,\tau) = \Gamma(i,t,\tau-1) + \Theta(i,x_{t-\tau}) \qquad (32')$$

$$H(\tau) = \Phi(i,t-\tau) + \Gamma(i,t,\tau) + \Delta(i,\tau) \qquad (33')$$

wherein the following relations are defined.

$\Phi(i,t) = \log \phi(i,t)$ $\Delta(i,\tau) = \log d_i(\tau)$ $\Theta(i,t,\tau) = \log B(i,t,\tau)$ $\Phi(i,x_t) = \log b_i(x_t)$ (1) Further, the above-mentioned steps (1) and (2) become as follows.

(1) Executing the following equations for $\tau=1$ to t-1.

$\Gamma(i,t,\tau) = \Gamma(i,t,\tau-1) + \Theta(i,x_{t-\tau})$ $H(\tau) = \Phi(i,t-\tau) + \Gamma(i,t,\tau) + \Delta(i,\tau)$ $$(2)\ \Phi(i+1,t) = \max_{\tau}[H(\tau)]$$

In this case, calculations made regarding the equations (30), (32) and (33) are altered to those of the equations (30'), (32') and (33') in the respective sections. It is unnecessary to change the composition of FIG. 6.

According to the manner mentioned above, the amount of calculation can be reduced a great deal even though the same result is obtained.

Various methods for the formation of the model can be considered other than the above method according to the steps (1) to (19). For instance, a method can be employed in which paths giving the maximum probability for respective r are sought according to the recurrence formula (30) or (30') and parameters of $b_i(x)$ and those of $d_i(\tau)$ are calculated from the feature vector series corresponding to a portion of the state i of the path obtained.

Namely, with respect to $d_i(\tau)$, the frame number $l_i(r)$ of the path corresponding to the state i is sought every r and a value averaged with respect to r is set as an averaged value of $d_i(\tau)$. For instance, since the averaged value of $d_i(\tau)$ is $1/(1-\gamma_i)$ if $d_i(\tau) = \gamma_i^{\tau-1}(1-\gamma_i)$ and since $$1/(1-\gamma_i) = \sum_{r=1}^{R} l_i(r)/R$$

$\gamma_i$ is given as follows, $$\gamma_i = 1 - \frac{1}{\frac{1}{R}\sum_{r=1}^{R} l_i(r)}$$

The estimation of parameters $W_i$ and $\Sigma_i$ of $b_i(x)$ can be effected in the following manner.

Assuming that $x_{t-\tau}^{(r)(r)}$ to $x_{t-1}^{(r)}$ correspond to the state o wherein $\tau^{(r)}$ indicates the frame number corresponding to the state $q_i$ of $x_{t-\tau-1+k}^{(r)(r)}$ is a teacher signal, $W_i$ is estimated by an error back-propagation method in such a manner the following quantity is minimized.

$$\sum_{r=1}^{R}\sum_{k=1}^{\tau^{(r)}} \{x_{t-\tau-1+k}^{(r)(r)} - g_i(l)\}^T \Sigma_i^{-1} \{x_{t-\tau-1+k}^{(r)(r)} g_i(l)\}$$

Also, the estimation value of $\Sigma_i$ can be obtained from the following equation.

$$\Sigma_i = \sum_{r=1}^{R}\sum_{k=1}^{\tau^{(r)}} \frac{1}{\tau^{(r)}} (x_{t-\tau-1+k}^{(r)(r)} - x_{t-\tau-1+k}^{(r)(r)}) \times$$

$$(x_{t-\tau-1+k}^{(r)(r)} - x_{t-\tau-1+k}^{(r)(r)})^T$$

In this case, frames of the state i are obtained by storing $BB(i+1, t) = t - \tau_{opt}$ for $t=1$ to $T^{(r)}+1$ and i=1 to I wherein $\tau_{opt}$ denotes an optimal value of t to $\tau$ and i in the calculation of the recurrence formula (30 ) or (30'). The starting frame $t_i$ of the state i in the optimal path corresponding to r is given as follows.

$$t_I = T^{(r)} + 1, t_{I-1} = BB(t_I), t_{I-2} = BB(t_{I-1}), \ldots$$
$$t_2 = BB(t_3), t_1 = BB(t_2) = 1$$

Although the transition probability in the same state is explained as invariant irrespective of the staying time thereof in the above preferred embodiment, it is unnecessary in this case to consider $d_i(\tau)$ and, accordingly, $\tau$, namely, loops of $\tau$ become unnecessary. Therefore, the amount of calculation can be reduced. However, the above description regarding $d_i(\tau)$ is intended to be applied for the case in which $d_i(\tau)$ is given by a distribution in a general form such as normal distribution or Poisson distribution. Namely, parameters can be estimated in the above case according to the same method as mentioned above.

The recognition experiment for Japanese digit utterance using the present invention was executed.

Experimental conditions;
* samples
  For training: 51 speakers (36 males and 15 females)
  For recognizing: 52 speakers (39 males and 13 females excepting training speakers), 520 utterances
* Number of states: 7 with loop and 1 for termination
* Number of layers of neural predictor: 3
* Number of hidden units of neural predictor: 10

The recognition rate by the HMM according to the present invention was 99.4%. This recognition rate is the highest among recognition rates having been ever previously obtained.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An analyzing system for analyzing object signals, comprising voice signals, by estimating a generation likelihood of an observation vector sequence being a time series of feature vectors X ($=x_1, \ldots, x_T$; T is a total number of frames) with use of a Markov model having a plurality of states i (i=1, ..., N; N is a total number of states) and given transition probabilities from state i to state j (i, j=1, ..., N), comprising:
   feature extraction means for converting the object signals into the time series of feature vectors X;
   a state designation means for determining a state i at a time t stochastically using said Markov model;
   a plurality of predictors each of which is composed of a neural network and is provided per each state of said Markov model for generating a predictional vector $g_i(t)$ of said feature vector $x_t$ in said state i at the time t based on values of the feature vectors other than said feature vector $x_t$;
   a first calculation means for calculating an error vector of said predictional vector $g_i(t)$ to said feature vector $x_T$; and
   a second calculation means for calculating a generation likelihood of said error vector using a predetermined probability distribution of the error vector according to which said error vector is generated.

2. The analyzing system as claimed in claim 1 in which said predictor is comprised of a neural network having an input layer, at least one hidden layer and an output layer, said neural network being constructed so as to output a predictional vector of a feature vector when other feature vectors are input to said input layer.

3. The analyzing system as claimed in claim 2 in which each respective layer of said neural network is made up of units having a non-linear input to output characteristic.

4. The analyzing system as claimed in claim 1 wherein parameters used for defining said Markov model and respective predictors are determined based on a parameter estimation learning sequence wherein a set of training observation vector sequences are provided and renewal of said parameters is repeated until a generation likelihood for said training observation vector sequences estimated by the analyzing system becomes a maximum.

5. A recognition system for recognizing object signals comprising voice signals, comprising:
   a plurality of analyzing apparatuses each for estimating a generation likelihood of an observation vector sequence being a time series of feature vectors X ($=x_t, \ldots, x_t$; t is a total number of frames) with use of a Markov model having a plurality of states i (i=1, ..., N; N is a total number of states) and given transition probabilities from state i to state j (i, j=1, ..., N);
   feature extraction means for converting the object signals into the time series of feature vectors X;
   said each of analyzing apparatuses comprising a state designation means for determining a state i at a time t stochastically using said Markov model, a plurality of predictors each of which is composed of a neural network and is provided per each state of said Markov model for generating a predictional vector $g_i(t)$ of said feature vector $x_t$ in said state i at the time t based on values of the feature vectors other than said feature vector $x_t$, a first calculation means for calculating an error vector of said predictional vector $g_i(t)$ to said feature vector $x_t$, and a second calculation means for calculating a generation likelihood of said error vector using a predetermined probability distribution of the error vector according to which said error vector is generated, and being adapted for a category for an observation vector sequence to be categorized;
   a maximum likelihood detection means which compares likelihoods obtained by said plurality of analyzing apparatuses and detects a maximum value among said likelihoods; and
   a decision means for identifying said observation vector sequence to the category corresponding to one of said plurality of analyzing apparatuses which gives the maximum likelihood detected by said maximum likelihood detection means.

* * * * *